219-121

10/1/85 OR 4,544,824 SR

United States Patent [19]

Knutsson

[11] Patent Number: 4,544,824

[45] Date of Patent: Oct. 1, 1985

[54] EQUIPMENT FOR HANDLING SHEET MATERIAL IN A PATTERN CUTTING MACHINE

[75] Inventor: Lars G. Knutsson, Järfälla, Sweden

[73] Assignee: Ingenjörsfirma G. Knutsson AB, Järfälla, Sweden

[21] Appl. No.: 598,301

[22] PCT Filed: Jul. 4, 1983

[86] PCT No.: PCT/SE83/00272

§ 371 Date: Mar. 2, 1984

§ 102(e) Date: Mar. 2, 1984

[87] PCT Pub. No.: WO84/00180

PCT Pub. Date: Jan. 19, 1984

[30] Foreign Application Priority Data

Jul. 5, 1982 [SE] Sweden ............................... 8204155

[51] Int. Cl.[4] ............................................. B23K 26/00

[52] U.S. Cl. ............................... 219/121 LG; 83/152; 83/276; 83/402; 83/98; 219/121 FS; 219/121 LY

[58] Field of Search ................. 219/121 LG, 121 LN, 219/121 L, 121 LM, 121 FS, 121 LY; 83/152, 98, 99, 100, 435.1, 423, 402, 276, 277

[56] References Cited

U.S. PATENT DOCUMENTS

| | | | |
|---|---|---|---|
| 3,234,836 | 2/1966 | Buff | 83/152 UX |
| 3,304,820 | 2/1967 | Müller et al. | 83/423 X |
| 3,670,612 | 6/1972 | Johnson et al. | 83/276 X |
| 3,784,183 | 1/1974 | Castro et al. | 219/121 LG |

FOREIGN PATENT DOCUMENTS

| | | | |
|---|---|---|---|
| 0637249 | 12/1978 | U.S.S.R. | 219/121 LG |

*Primary Examiner*—C. L. Albritton
*Attorney, Agent, or Firm*—Burns, Doane, Swecker & Mathis

[57] ABSTRACT

The suction hood (20) can be moved in over the suction table (4) which can retain cloth during cutting by a laser. The suction surface of the hood opens simultaneously as the suction action of the table is reversed such that cut out portions of cloth are lifted and sucked against the suction surface of the hood. The hood (20) carries capturing means (50,51) at its forward edge for pulling fresh cloth in over the table (4) from a store (1), when said hood is moved away from the table (4), the fresh cloth being supported on an air cushion above the table (4), whereafter the suction surface of the hood (20) is closed off such portions of cloth are deposited on the deposition table (36).

7 Claims, 6 Drawing Figures

EQUIPMENT FOR HANDLING SHEET MATERIAL IN A PATTERN CUTTING MACHINE

TECHNICAL FIELD

The invention relates to equipment for handling sheet or stock material in a pattern cutting machine having a perforated worktable disposed for supporing the material, and means for cutting workpieces from the material.

BACKGROUND ART

Pattern cutting machines have been developed, the operation of which is controlled by programmed numerical control means, wherein a cutting device, e.g. a laser, cuts a desired pattern in the material, e.g. cloth. The time for the cutting operation itself has been greatly reduced in such machines, but it has not been possible to remove cut material and supply new material for cutting in a time satisfactorily short enough for properly being able to utilize the speed in cutting, and minimize the time required for an operational cycle, and this is essential in the machines where only one or a few material layers are cut in a cutting operation.

The inventive equipment is particularly utilizable in cutting cloth material for men's suits, particularly made-to-measure suits, measurements taken by the tailor being worked into the data program controlling the operation of the cutting head of the machine.

The cutting head may comprise, i.a. a deflection mirror deflecting a laser beam towards the material, there being mirrors arranged to lead the beam from a stationary laser unit to the cutting head, independent of its position relative the plane of the table.

One object of the invention is to provide a pattern cutting machine of the kind indicated, in which the material in a flat condition can be rapidly placed on the machine worktable, from which cut material may be rapidly and reliably removed for deposition on a deposition table. A further object is to provide treatment of a material such as woollen material when it is taken into the machine, such that odour caused by laser cutting of the material is reduced.

DISCLOSURE OF INVENTION

The invention relates to equipment for handling sheet material in a pattern cutting machine, including means for cutting workpieces from the material, a perforated worktable adapted for supporting the material web, an inverted hood adapted for extending over the underside of the perforated surface of the table, and fan means connected to said hood and adapted to establish a subpressure in said hood for retainging the material web on the table during the cutting operation, wherein a suction hood, having a perforated suction surface facing towards the table and with a size substantially corresponding to that of the table, is adapted for travel between a first position over the table and a second position outside one rear edge of the table, with the suction hood adapted such that it can attract and lift the material to its suction surface in the first position and release said material, in the second position, there being material capturing means arranged at the forward edge of said suction hood for coacting with the material on the table, to pull out a material web from a store arrange outside the forward edge of the table, when the suction hood moves to the second position, and wherein the fan means of the inverted hood is adapted to generate an excess pressure for supporting the material web on an air cushion when it is pulled out from the store and over the table.

Preferred embodiments of the invention are disclosed in the following sub-claims.

BRIEF DESCRIPTION OF DRAWINGS

The invention will now be described in detail in the following with the aid of an embodiment and with reference to the accompanying drawing, whereon

BEST MODE OF CARRYING OUT THE INVENTION

Figure 1:
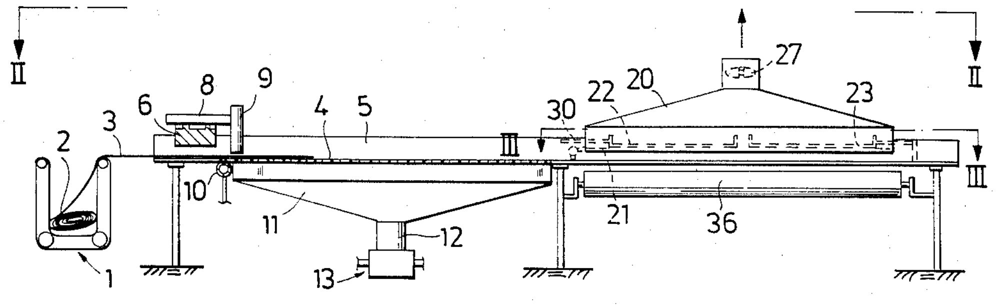
FIG. 1 is a schematical vertical section taken along the line I—I in FIG. 2, through equipment in accordance with the invention.
Figure 2:
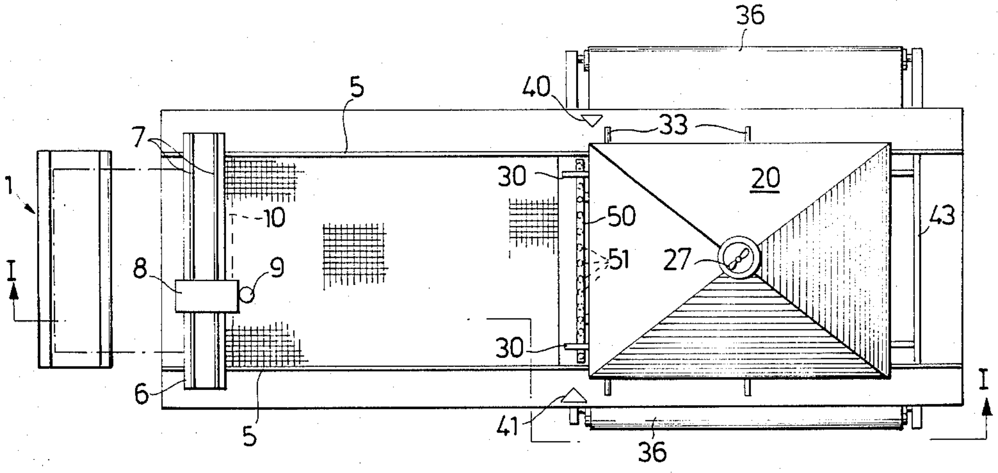
FIG. 2 is a view along the line II—II in FIG. 1.
Figure 3:
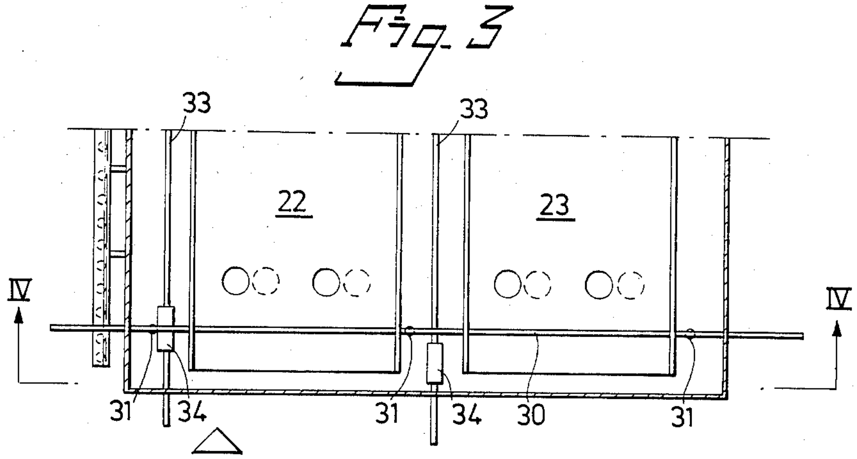
FIG. 3 is a portion of a section taken along the line III—III in FIG. 1.
Figure 4:
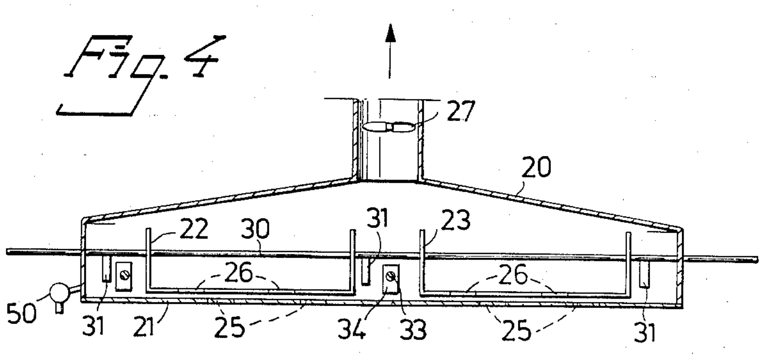
FIG. 4 is a section taken along the line IV—IV in FIG. 3.
Figure 6:
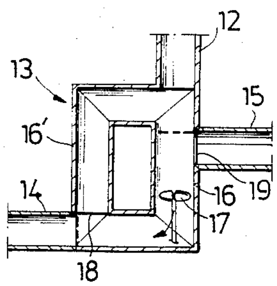
FIG. 6 illustrates details in a fan means connected to the inverted hood pertaining to the equipment.

FIGS. 1 and 2 illustrate a pattern cutting plant, including a conventional store 1 for a bolt of fabric 2, from which a material web 3 is pulled onto a perforated worktable 4. On either long side of the table there is a guide rail 5 for a first carriage 6, which in turn carries guide rails 7 for a second carriage 8, which carries a cutting head 9. e.g. for directing a cutting laser beam onto the table 4 from an unillustrated laser beam generating source. Unillustrated driving means, controlled via an unillustrated programmed computer, drive the carriages to desired positions in the plane defined by the table 4. At the forward edge of the table there is a steam spreader pipe 10 adapted for blowing steam through the material web 3 as the web is pulled over the table 4. The pipe 10 is perforated and extends over the width of the table. Under the perforated surface of the table 4 there is an inverted hood 11 having a connection duct 12 for connection to fan means 13 (see FIG. 6). The means 13 includes the connection duct 12, an inlet pipe 14 and two branch ducts 16, 16' between connection duct and outlet pipe. An inlet pipe 15 connects to the branch duct 16. There is a fan 17 downstreams of the pipe 15 in the branch duct 16. Adjustable flap valves 18, 19 are arranged at the junctions to pipes 14 and 15, respectively, as schematically illustrated. With the flaps in the positions illustrated by full lines and with the indicated operating direction of the fan, the inverted hood 11 is evacuated such that the material 3 is adhered by suction to the table 4. When the flaps are set to the position indicated by dashed lines, the inverted hood 11 is pressurized with air via the pipe 15. The pipe 14 leads air away from the hood 11. A suction hood 20 runs on rails 5 between the illustrated position above a deposition table 36 outside the forward rear edge of the worktable and a position above the table 4. The suction hood is evacuated with the aid of a fan 27. The surface of the suction hood 20 facing towards the tables 4, 36 is perforated. As will be more clearly apparent from FIGS. 3 and 4, there are perforated screening plates 22, 23 arranged inside the perforated surface 21 of the suction hood. The perforations of the surface 21 are illustrated at 25 and corresponding perforations in the plates at 26. A pushrod 30 extends through openings in the flanges of the hood and plates 22, 23. The rod carries dogs 31 in the illustrated positions.

A distance maintainer rod 33 extends in front of each plate 22, 23 and carries a distance maintainer 34. The rod 33 extends through the long sides of the suction hood.

When the hood moves to the right in FIG. 2, the rods 33 are actuated by an actuating wedge 40 such as to come into a bottom position in FIG. 2, wherein the distance maintainers 34 are not in contact with the dogs 31. The perforations 25,26 are now mutually in register. For further travel to the right in FIG. 2, the rod 30 comes against a fixed member 43, the plates 22, 23 being caused to cover the perforations 25. When the suction hood moves to the left in FIG. 2 the rods 33 are actuated by an activating wedge 41 such that the distance maintainers 34 are moved between the respective dog 31 and plate 22, 23. For continued movement to the left in FIG. 2, the rod 30 knocks against the carriage 6, whereby the plates 22,23 are displaced such that the perforations 25, 26 come into register.

Figure 5:
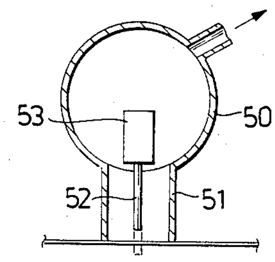
FIG. 5 illustrates a detail of a material capturing means carried by the suction hood pertaining to the equipment.

At its forward edge the suction hood has a suction line 50 with a plurality of suction nozzles 51 (see FIG. 5). In at least one nozzle 51 there is a pin 52 driven by a solenoid 53. The tip of the pin 52 moves between a position inwards of the nozzle opening and a position outside the opening for penetrating the material 3.

The plant operates in the following manner.

Let it be assumed that material 3 covers the surface of the table 4 and is sucked towards it with the aid of the fan means 13. The cutting head is operated for cutting desired parts of the material and for cutting off the material web. The suction hood 20 is then moved to the left in FIGS. 1 and 2, the fan 27 being in operation and the suction surface 21 being covered by the plates 22, 23. When the pushrods 30 come against the carriage 6, the suction surface 21 is opened in the parts corresponding to the plates 22, 23 which have passed the wedge 41. The fan means 13 is reversed at the same time so that the material 3 is lifted up towards the surface 21, an impulse action being obtained such that the material is positively lifted and sucked against the surface 21.

The nozzles 51 are caused to suck and the pins 52 are caused to penetrate the material behind the cutting-off line to take hold of the uncut material web at its forward edge. The hood is now driven to the right in FIGS. 1 and 2, steam being forced into the material with the aid of the pipe 10 as the material is pulled out from the store 1. The material is lifted by an air cushion generated by the fan means 13 and is seized by the nozzle. When the hood reaches the position according to FIGS. 1 and 2, the plates 22, 23 are caused to cover the suction surface 21 so that the material parts fall down onto the conveyor 36. The conveyor 36 may be an endless conveyor belt over two rolls, of which one is drivable, as is illustrated in FIGS. 1 and 2.

The suction action of the nozzles 51 is now broken off and the pins 52 withdrawn, whereafter the fan means 13 is set to suction for retaining the new material 3 on the table 4.

The material parts on the conveyor 30 can now be fed out transverse the travel direction of the suction hood 20 and be taken care of, while the cutting operation next in sequence is in progress.

The cutting head 3 can to advantage be surrounded by a suction nozzle locally sucking up the smoke from cutting the material. Smoke and gases are thereby evacuated partly via the surface of the table 4 and partly via said suction nozzle, the material being kept in the correct position relative the cutting head during cutting by the laser. Returning now to FIGS. 3 and 4, it must be emphasized that these figures only schematically illustrate an example of the number of perforations 25, 26 and plates 22, 23, which are many times more in reality. The system illustrated in FIG. 3 has its advantage in that the effective suction area of the suction hood is automatically suited to the size of the material on the table 4, such that when the length of the material is less than that of the table, the material in question is placed between the rear edge of the table and the carriage 6. Accordingly, no substantial quantity of air will be sucked through the suction surface 21 of the suction hood 20 outside the material. In this way it is ensured that the suction hood is capable of lifting and retaining a cut out piece of material i.a. a foursided piece of material which is cut into a plurality of separate parts.

I claim:

1. Equipment for handling sheet material in a pattern cutting machine including means (9) for cutting workpieces from the material, a perforated worktable (4) disposed for supporting the material web (3), an inverted hood (11) adapted to extend over the underside of the perforated table surface, and fan means (13) connected to the hood (11), said means being adapted to establish a sub-pressure in said hood (11) for retaining the material web (3) on the table (4) during the cutting operation, characterized in that a suction hood (20) with a perforated suction surface (21) facing towards the surface of the table and having a size substantially corresponding to that of the table, is adapted displaceable between a first position over the worktable (4) and a second position outside one rear edge of the table, in that the suction hood (20) is adapted to attract and lift the material with its suction surface in the first position, and to release the material in its second position, in that a material capturing means (50, 51) is disposed at the forward edge of the suction hood (20), in that a store (1) of material is arranged outside the forward edge of the table, in that the capturing means is adapted for coaction with the material on the table for pulling out a material web from the store (1) over the table (4) when the suction hood (20) moves to its second position and in that the fan means (13) of the inverted hood (11) is adapted for generating an excess pressure in said hood (11) for supporting the material web (3) on an air cushion when it is pulled out from the store over the table.

2. Equipment as claimed in claim 1, characterized in that the suction hood (20) is arranged to be at a subpressure and that the perforated suction surface (21) of said hood is adapted for being able to be opened and closed when said hood has assumed the first and second positions, respectively.

3. Equipment as claimed in claim 1, characterized in that the material capturing means (50, 51) includes pins (52) adapted for penetrating the material web (3) when the suction hood (20) has assumed the first position.

4. Equipment as claimed in claim 3, characterized in that the material capturing means (50, 51) includes a plurality of suction nozzles (51) each containing a pin (52), in that the pins are axially movable in respect to the nozzles such as to extend out past the opening plane of the nozzle (51) in the first position of the suction hood, and in that the nozzles (51) are adapted for retaining the material web (3) by suction when said hood is in the first position.

5. Equipment as claimed in any of claims 1-4, characterized in that the material is a textile web and that a steam blowing means (10) is mounted at the forward edge of the table, and in that said means is adapted to blow steam through the material as it is pulled over the table during the movement of the suction hood (20) to the second position.

6. Equipment as claimed in claim 1, characterized in that a deposition table (36) is arranged under the suction hood (20) in its second position and that said table is preferably formed by a belt conveyor having a conveying direction extending at right angles to the travel of said suction hood.

7. Equipment as claimed in claim 1, characterized in that the fan means (13) of the inverted hood (11) is adapted such as to provide an excess pressure in said hood for lifting the material (3) so that it can be brought into suction engagement against the suction surface (21) of the suction hood (20).

* * * * *